United States Patent
Kim et al.

(10) Patent No.: US 12,326,630 B2
(45) Date of Patent: Jun. 10, 2025

(54) DISPLAY APPARATUS AND LIGHT SOURCE APPARATUS THEREOF

(71) Applicant: SAMSUNG ELECTRONICS CO., LTD., Suwon-si (KR)

(72) Inventors: Hyungsuk Kim, Suwon-si (KR); Kyehoon Lee, Suwon-si (KR); Chunsoon Park, Suwon-si (KR); Hyukjun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 276 days.

(21) Appl. No.: 18/088,321

(22) Filed: Dec. 23, 2022

(65) Prior Publication Data
US 2023/0288752 A1    Sep. 14, 2023

Related U.S. Application Data

(63) Continuation of application No. PCT/KR2022/017231, filed on Nov. 4, 2022.

(30) Foreign Application Priority Data

Mar. 11, 2022 (KR) .................. 10-2022-0030973

(51) Int. Cl.
G02F 1/13357  (2006.01)
G02F 1/1335   (2006.01)

(52) U.S. Cl.
CPC .... *G02F 1/133602* (2013.01); *G02F 1/13356* (2021.01)

(58) Field of Classification Search
CPC .......... G02F 1/133602; G02F 1/13356; G02F 1/1336; G02F 1/133603; G02F 1/133608; G02F 1/133611
See application file for complete search history.

(56) References Cited

U.S. PATENT DOCUMENTS

| 8,240,866 B2 | 8/2012 | Min |
| 2007/0103908 A1 | 5/2007 | Tabito et al. |

(Continued)

FOREIGN PATENT DOCUMENTS

| JP | 2010-15753 A | 1/2010 |
| JP | 2019-46667 A | 3/2019 |
| KR | 10-2008-0021370 A | 3/2008 |

(Continued)

OTHER PUBLICATIONS

Written Opinion (PCT/ISA/237) issued by the International Searching Authority on Feb. 10, 2023 in International Application No. PCT/KR2022/017231.

(Continued)

*Primary Examiner* — Thomas M Sember
(74) *Attorney, Agent, or Firm* — Sughrue Mion, PLLC

(57) ABSTRACT

A light source apparatus includes an optical member; a substrate provided at a first side of the optical member; a light source provided on the substrate and configured to emit light; and a supporter provided between the optical member and the substrate, wherein the supporter includes: a supporter body provided on the substrate; a curing device provided in the supporter body; and an adhesive member provided at a first end of the supporter body that is nearest to the optical member.

18 Claims, 13 Drawing Sheets

(56) References Cited

U.S. PATENT DOCUMENTS

2020/0209460 A1*   7/2020  Achi .................... F21V 5/04
2021/0092211 A1*   3/2021  Tang ................... G02F 1/1368

FOREIGN PATENT DOCUMENTS

| KR | 10-2011-0072355 A | 6/2011 |
| KR | 10-2034067 B1 | 11/2019 |
| KR | 10-2237160 B1 | 4/2021 |
| KR | 10-2300505 B1 | 9/2021 |

OTHER PUBLICATIONS

International Search Report (PCT/ISA/210) issued by the International Searching Authority on Feb. 10, 2023 in International Application No. PCT/KR2022/017231.

* cited by examiner

DISPLAY APPARATUS AND LIGHT SOURCE APPARATUS THEREOF

CROSS-REFERENCE TO RELATED APPLICATION(S)

This application is a bypass continuation application of International Application No. PCT/KR2022/017231, filed on Nov. 4, 2022, which is based on and claims priority to Korean Patent Application No. 10-2022-0030973, filed on Mar. 11, 2022 in the Korean Intellectual Property Office, the disclosures of which are incorporated by reference herein in their entireties.

BACKGROUND

1. Field

The disclosure relates to a display apparatus and a light source apparatus thereof, and more specifically, to a display apparatus having an optical sheet and a light source apparatus thereof.

2. Description of the Related Art

A display apparatus is an output device configured to convert acquired or stored electrical information to visual information and display the visual information to a user, and is used in various areas such as a home, a business, and the like.

A display apparatus may be, for example, a monitor device connected to a personal computer, a server computer, or the like, a portable computer device, a navigation terminal device, a general television device, an Internet protocol television (IPTV) device, a portable terminal device such as a smart phone, a tablet PC, a personal digital assistant (PDA), a cellular phone, or the like, various display apparatuses used to reproduce an image such as an advertisement or a movie in an industrial field, various other audio/video systems, or the like.

The display apparatus includes a light source apparatus to convert the electrical information to visual information, and the light source apparatus includes a plurality of light sources configured to independently emit light.

Each of the plurality of light sources includes, for example, a light-emitting diode (LED) or an organic light-emitting diode (OLED). For example, the light-emitting diode or the organic-light-emitting diode can be mounted on a substrate (or a circuit board).

SUMMARY

Provided are a display apparatus capable of reducing a change in an optical distance between a light source and an optical member and a light source apparatus thereof.

Further, provided are a display apparatus capable of improving image quality uniformity and a light source apparatus thereof.

Further still, provided are a display apparatus capable of improving strength and a light source apparatus thereof.

Further still, provided are a display apparatus capable of preventing damage to an optical member and a light source apparatus thereof.

Additional aspects of the disclosure will be set forth in part in the description which follows and, in part, will be apparent from the description, or may be learned by practice of the presented embodiments.

According to an aspect of the disclosure, a light source apparatus includes: an optical member; a substrate provided at a first side of the optical member; a light source provided on the substrate and configured to emit light; and a supporter provided between the optical member and the substrate, wherein the supporter includes: a supporter body provided on the substrate; a curing device provided in the supporter body; and an adhesive member provided at a first end of the supporter body that is nearest to the optical member.

The curing device may include a light-emitting diode configured to emit light of a predetermined wavelength to cure the adhesive member.

The light source apparatus may further include: a first feed line provided on the substrate and configured to supply power to the light source; and a second feed line provided on the substrate and configured to supply power to the light-emitting diode.

The light-emitting diode may be configured to emit ultraviolet light; and the adhesive member may include a material that is curable by the ultraviolet light emitted from the light-emitting diode.

The light-emitting diode may be further configured to emit light of a first wavelength that is different from a second wavelength of the light emitted from the light source.

The light-emitting diode may be further configured to be driven independently of the light source.

The light-emitting diode may be provided on the substrate.

The supporter body may include a body support extending toward and supporting the optical member.

The supporter body may include a seater at an inner side of the body support, and the adhesive member may be provided on the seater.

The adhesive member may be adhered to the optical member based on being cured by the curing device.

The supporter body may include a material having a strength that higher than a strength the adhesive member.

The adhesive member may include at least one of a transparent material and a translucent material.

The adhesive member may be configured so that the light emitted from the light source passes therethrough.

The optical member may include at least one of a diffuser plate, a diffuser sheet, a prism sheet, and a reflective polarization sheet.

According to an aspect of the disclosure, a display apparatus includes: a bottom chassis; a substrate provided in the bottom chassis; a first light-emitting diode provided on the substrate and configured to emit light; an optical member provided at a first side of the substrate; and a supporter provided between the optical member and the substrate, wherein the supporter includes: a supporter body provided on the substrate; an adhesive member provided at a first end of the supporter body that is nearest to the optical member; and a second light-emitting diode provided in the supporter body and configured to emit light of a predetermined wavelength for curing the adhesive member.

According to an aspect of the disclosure, a light source apparatus includes: an optical member; a light source configured to emit light; and a supporter provided between the optical member and a substrate, wherein the supporter includes: an adhesive member provided at a first end of a supporter body, the first end being nearest to the optical member; and a light-emitting diode provided in the supporter body.

The light-emitting diode may be configured to emit light of a predetermined wavelength.

The predetermined wavelength may correspond to a first wavelength for curing the adhesive member.

A curing time of the adhesive member may correspond to a size of the light-emitting diode.

The curing time of the adhesive member may be inversely proportional to the size of the light-emitting diode.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
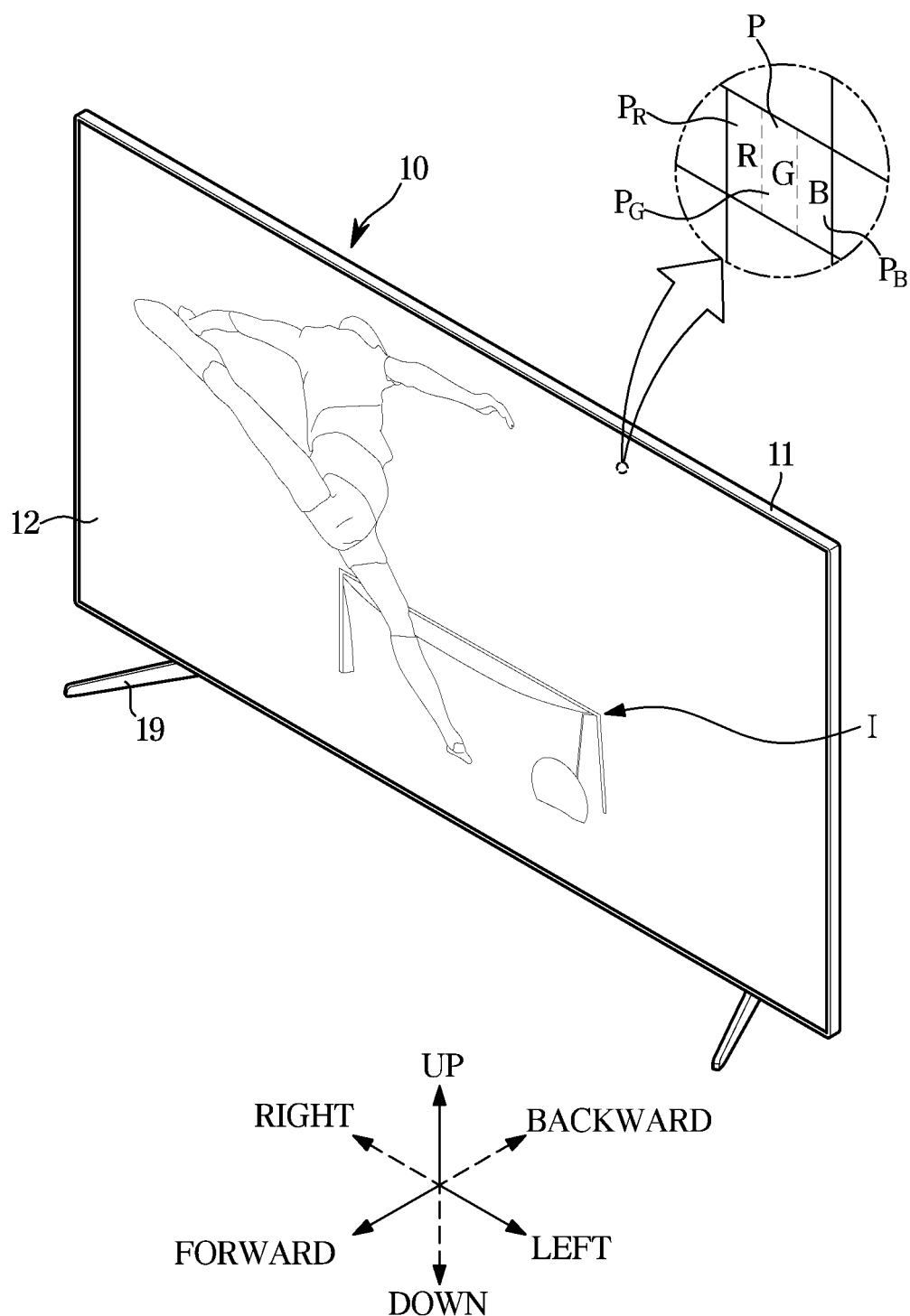
FIG. 1 is a view illustrating an appearance of a display apparatus according to an embodiment.

The same reference numerals refer to the same elements throughout the specification. The specification does not describe all elements of the embodiments, and general contents in the technical field including the present disclosure or contents which overlap between the embodiments are omitted. The terms 'part, module, member, or block' used in the specification may be implemented as software or hardware, and according to embodiments, a plurality of 'parts, modules, members, or blocks' may be implemented as a single component, or one 'part, module, member, or block' may include a plurality of components.

Throughout the specification, a case in which a part is "connected" to another part includes not only direct connection but also indirect connection, and the indirect connection includes connection through a wireless communication network.

Further, a case in which a part "includes" a certain component means that other components may be further included, rather than excluding other components, unless otherwise described.

Throughout the specification, a case in which a member is located "on" another member includes not only a case in which a member comes into contact with another member but also a case in which still another member is present between the two members.

Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Terms such as first, second, and the like are used to distinguish one component from another component, and the components are not limited by the above-mentioned terms.

According to embodiments, the singular form is intended to also include the plural form unless the context clearly indicates otherwise.

In each step, the identification number is used for convenience of description, and the identification number does not describe an order of each step, and each step may be differently performed from the specified order unless the specific order is clearly disclosed in the context.

Hereinafter, the working principle and embodiments of the present disclosure will be described with reference to the accompanying drawings.

FIG. 1 is a view illustrating a display apparatus according to an embodiment.

The display apparatus 10 is a device for processing an image signal received from the outside and visually displaying the processed image. Hereinafter, an example in which the display apparatus 10 is a television (TV) is described, but the present disclosure is not limited thereto. For example, the display apparatus 10 may be implemented in various forms such as a monitor, a portable multimedia device, a portable communication device, and the like, and the forms of the display apparatus 10 are not limited in the case of a device configured to visually display an image.

In addition, the display apparatus 10 may be a large format display (LFD) installed at the outside such as on a rooftop of a building or at a bus stop. Here, the outside is not necessarily limited to the outdoors, and the display apparatus 10 according to one embodiment may be installed in a place where a large number of people may enter and exit even in the case of indoors such as a subway station, a shopping mall, a movie theater, a company, a store, or the like.

The display apparatus 10 may receive content data including video data and audio data from various content sources, and output a video and an audio respectively corresponding to the video data and the audio data. For example, the display apparatus 10 may receive content data through a broadcast reception antenna or a wired cable, receive content data from a content reproduction device, or receive content data from a content providing server of a content provider.

As shown in FIG. 1, according to an embodiment, the display apparatus 10 includes a main body 11, a screen 12 configured to display an image I, and a support 19 provided under the main body 11 to support the main body 11.

The main body 11 forms an appearance of the display apparatus 10, and components configured to cause the display apparatus 10 to display the image I or perform various functions may be provided in the main body 11. The main body 11 shown in FIG. 1 has a flat plate shape, but the shape of the main body 11 is not limited to the case shown in FIG. 1. For example, the main body 11 may have a curved plate shape.

The screen 12 may be formed on a front surface of the main body 11, and may display the image I. For example, the screen 12 may display a still image or a video. Further, the screen 12 may display a two-dimensional flat image or a three-dimensional stereoscopic image using the parallax of a user's eyes.

A plurality of pixels P are formed on the screen 12, and the image I displayed on the screen 12 may be formed by light emitted from each of the plurality of pixels P. For example, the image I may be formed on the screen 12 by combining the light emitted by the plurality of pixels P like a mosaic.

Each of the plurality of pixels P may emit light of various brightnesses and colors. For example, each of the plurality of pixels P includes a self-luminous light-emitting panel (for example, a light-emitting diode panel) capable of directly emitting light, or a non-self-luminous light-emitting panel capable of allowing light emitted by a light source apparatus or the like to pass therethrough or blocking the light (for example, a liquid crystal panel).

In order to emit light of various colors, each of the plurality of pixels P may include sub-pixels PR, PG, and PB.

The sub-pixels PR, PG, and PB may include a red sub-pixel PR capable of emitting red light, a green sub-pixel PG capable of emitting green light, and a blue sub-pixel PB capable of emitting blue light. For example, the red light may represent light of a wavelength from approximately 620 nm (nanometer, billionths of a meter) to 750 nm, the green light may represent light of a wavelength from approximately 495 nm to 570 nm, and the blue light may represent light of a wavelength from approximately 450 nm to 495 nm.

The light of various brightnesses and colors may be emitted from each of the plurality of pixels P by combination of the red light of the red sub-pixel PR, the green light of the green sub-pixel PG, and the blue light of the blue sub-pixel PB.

Figure 2:
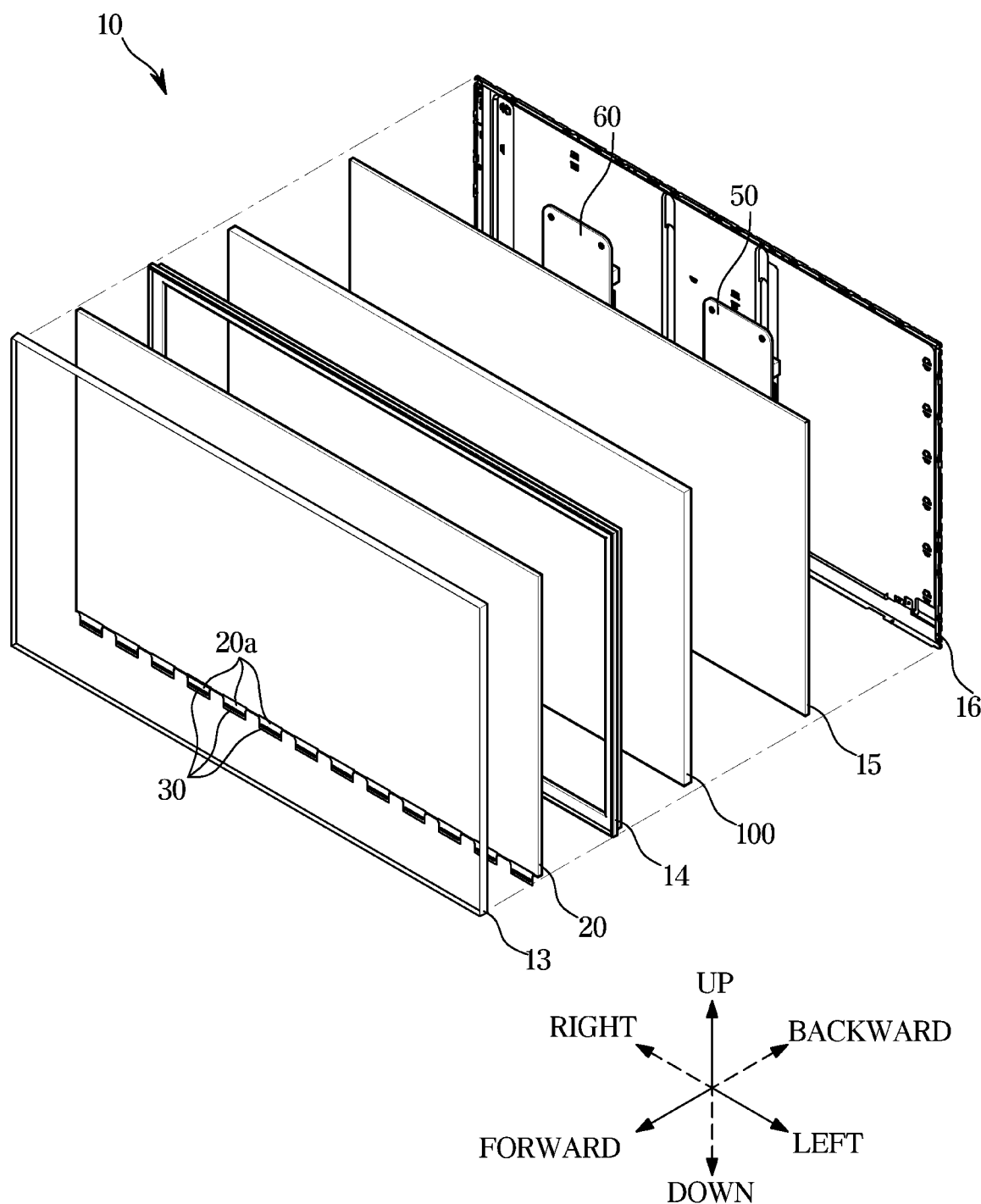
FIG. 2 is an exploded view of a display apparatus shown in FIG. 1, according to an embodiment.

FIG. 2 is an exploded view of the display apparatus shown in FIG. 1, according to an embodiment.

As shown in FIG. 2, various components configured to generate the image I on a screen S may be provided in the main body 11.

For example, the main body 11 is provided with a light source apparatus 100 which is a surface light source, a liquid crystal panel 20 configured to block the light emitted from the light source apparatus 100 or allow the light to pass therethrough, a control assembly 50 configured to control operations of the light source apparatus 100 and the liquid crystal panel 20, and a power assembly 60 configured to supply power to the light source apparatus 100 and the liquid crystal panel 20. Further, the main body 11 includes a bezel 13, a frame middle mold 14, a bottom chassis 15, and a back cover 16 configured to support and fix the liquid crystal panel 20, the light source apparatus 100, the control assembly 50, and the power assembly 60.

A cable 20a configured to transmit image data to the liquid crystal panel 20, and a display driver integrated circuit 30 (DDI, hereinafter, referred to as a 'driver IC') configured to process digital image data and output an analog image signal are provided at one side of the liquid crystal panel 20.

The cable 20a may electrically connect the control assembly 50/power assembly 60 and the driver IC 30, and may also electrically connect the driver IC 30 and the liquid crystal panel 20. The cable 20a may include a flexible flat cable, a film cable, or the like, which may be bent.

The driver IC 30 receives the image data and power from the control assembly 50/power assembly 60 through the cable 20a, and supplies the image data and a driving current to the liquid crystal panel 20 through the cable 20a.

Further, the cable 20a and the driver IC 30 may be integrally implemented as a film cable, a chip on film (COF), a tape carrier package (TCP), or the like. In other words, the driver IC 30 may be disposed on the cable 20a. However, the present disclosure is not limited thereto, and the driver IC 30 may be disposed on the liquid crystal panel 20.

The control assembly 50 may include a control circuit configured to control the operations of the liquid crystal panel 20 and the light source apparatus 100. The control circuit may process image data received from an external content source, transmit the image data to the liquid crystal panel 20, and transmit dimming data to the light source apparatus 100.

The power assembly 60 may supply power to the liquid crystal panel 20 and the light source apparatus 100 so that the light source apparatus 100 outputs surface light and the liquid crystal panel 20 blocks the light from the light source apparatus 100 or allows the light to pass therethrough.

The light source apparatus 100 may include a point light source configured to emit monochromatic light or white light, and may refract, reflect, and scatter the light to convert light emitted from the point light source to uniform surface light. For example, the light source apparatus 100 may include a plurality of light sources 111 configured to emit the monochromatic light or the white light, a diffuser plate 130 configured to diffuse light incident from the plurality of light sources 111, a reflective sheet 120 configured to reflect light emitted from the plurality of light sources 111 and a back surface of the diffuser plate 130, and an optical sheet 140 configured to refract and scatter light emitted from a front surface of the diffuser plate 130.

Like the above, the light source apparatus 100 may emit the uniform surface light toward the front by refracting, reflecting, and scattering the light emitted from the light sources.

Configurations of the light source apparatus 100 will be described below in more detail.

Figure 3:
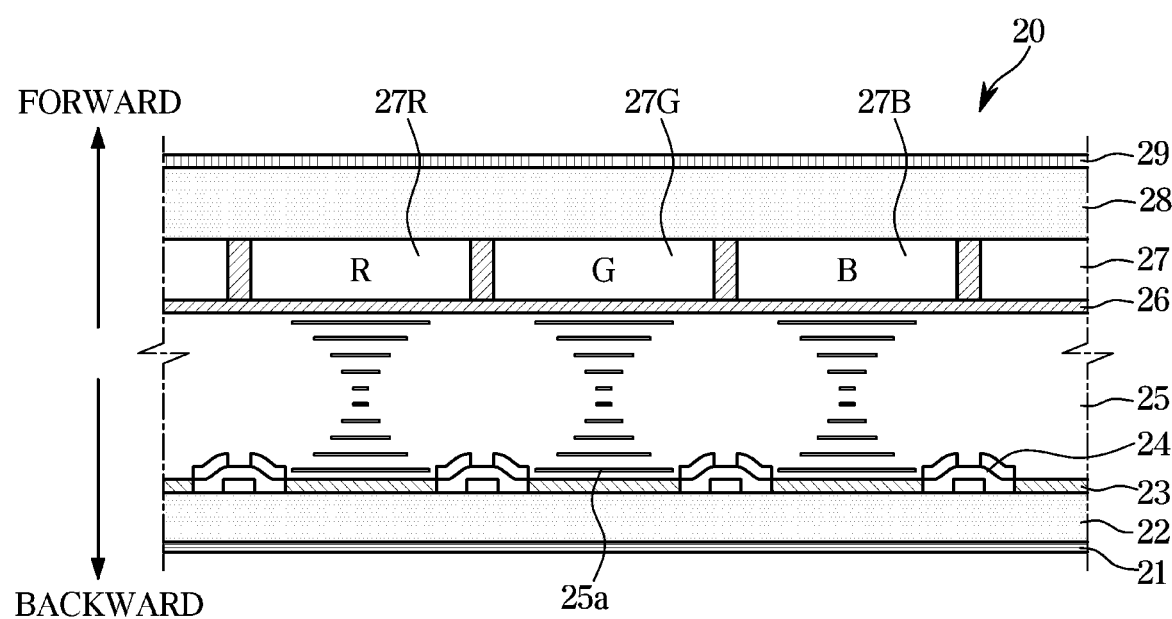
FIG. 3 is a view illustrating a side cross-section of a liquid crystal panel of a display apparatus shown in FIG. 2, according to an embodiment.

FIG. 3 is a view illustrating a side cross-section of the liquid crystal panel of the display apparatus shown in FIG. 2, according to an embodiment.

The liquid crystal panel 20 is provided in front of the light source apparatus 100, and blocks the light emitted from the light source apparatus 100 or allows the light to pass therethrough to form the image I.

A front surface of the liquid crystal panel 20 may form the screen 12 of the above-described display apparatus 10, and the liquid crystal panel 20 may form the plurality of pixels P. In the liquid crystal panel 20, the plurality of pixels P may each independently block the light of the light source apparatus 100 or allow the light to pass therethrough, and the light passing through the plurality of pixels P may form the image I displayed on the screen 12.

For example, as shown in FIG. 3, the liquid crystal panel 20 may include a first polarization film 21, a first transparent substrate 22, a pixel electrode 23, a thin film transistor 24, a liquid crystal layer 25, a common electrode 26, a color filter 27, a second transparent substrate 28, and a second polarization film 29.

The first transparent substrate 22 and the second transparent substrate 28 may fix and support the pixel electrode 23, the thin film transistor 24, the liquid crystal layer 25, the common electrode 26, and the color filter 27. The first and second transparent substrates 22 and 28 may be composed of tempered glass or a transparent resin.

The first polarization film 21 and the second polarization film 29 are respectively provided at outer sides of the first and second transparent substrates 22 and 28.

Each of the first polarization film 21 and the second polarization film 29 may allow specific light to pass therethrough and block other light. For example, the first polarization film 21 allows light having a magnetic field which oscillates in a first direction to pass therethrough and blocks other light. Further, the second polarization film 29 allows light having a magnetic field which oscillates in a second direction to pass therethrough and blocks other light. In this case, the first direction and the second direction may be orthogonal to each other. Accordingly, a polarization direction of the light passing through the first polarization film 21 and an oscillation direction of the light passing through the second polarization film 29 are orthogonal to each other. As a result, generally, light may not pass through the first polarization film 21 and the second polarization film 29 at the same time.

The color filter 27 may be provided at an inner side of the second transparent substrate 28.

The color filter 27 may include, for example, a red filter 27R configured to allow red light to pass therethrough, a green filter 27G configured to allow green light to pass therethrough, and a blue filter 27B configured to allow blue light to pass therethrough, and the red filter 27R, the green filter 27G, and the blue filter 27B may be disposed in parallel. A region where the color filter 27 is formed corresponds to the above-described pixel P. A region where the red filter 27R is formed corresponds to the red sub-pixel PR, a region where the green filter 27G is formed corresponds to the green sub-pixel PG, and a region where the blue filter 27B is formed corresponds to the blue sub-pixel PB.

The pixel electrode 23 may be provided at an inner side of the first transparent substrate 22, and the common electrode 26 may be provided at the inner side of the second transparent substrate 28.

The pixel electrode 23 and the common electrode 26 may be composed of a metal material that conducts electricity, and may generate an electric field for changing the arrangement of liquid crystal molecules 25a constituting the liquid crystal layer 25 to be described below.

The pixel electrode 23 and the common electrode 26 may be composed of a transparent material, and may allow light incident from the outside to pass therethrough. For example, the pixel electrode 23 and the common electrode 26 may be composed of indium tin oxide (ITO), indium zinc oxide (IZO), a silver nanowire (Ag nanowire), a carbon nanotube (CNT), graphene, poly(3,4-ethylenedioxythiophene) (PEDOT), or the like.

The thin film transistor (TFT) 24 is provided at the inner side of the first transparent substrate 22.

The thin film transistor 24 may allow a current flowing through the pixel electrode 23 to pass therethrough or block the current. For example, an electric field may be formed or removed between the pixel electrode 23 and the common electrode 26 according to turn-on (closed) or turn-off (open) of the thin film transistor 24.

The thin film transistor 24 may be composed of polysilicon, and may be formed by semiconductor processes such as a lithography process, a deposition process, an ion implantation process, and the like.

The liquid crystal layer 25 is formed between the pixel electrode 23 and the common electrode 26, and is filled with the liquid crystal molecules 25a.

A liquid crystal indicates an intermediate state between a solid (crystal) and a liquid. Most of the liquid crystal materials are organic compounds, their molecular shape is a long and thin rod, and may have a crystal form in which the arrangement of the molecules is irregular in any direction, but is regular in another direction. As a result, the liquid crystal has both fluidity of the liquid and optical anisotropy of the crystal (solid).

Further, the liquid crystal also exhibits optical properties according to a change in electric field. For example, in the liquid crystal, the direction of the arrangement of molecules constituting the liquid crystal may be changed according to the change in electric field. When the electric field is generated in the liquid crystal layer 25, the liquid crystal molecules 25a of the liquid crystal layer 25 are arranged according to the direction of the electric field, and when the electric field is not generated in the liquid crystal layer 25, the liquid crystal molecules 25a may be irregularly arranged. or may be arranged along an alignment layer. As a result, the optical properties of the liquid crystal layer 25 may be changed according to the presence or absence of the electric field passing through the liquid crystal layer 25.

The control assembly 50 and the power assembly 60 may be implemented as a printed circuit board and various circuits mounted on the printed circuit board. For example, the power circuit may include a capacitor, a coil, a resistor, a processor, and the like, and a power circuit board on which the above parts are mounted. Further, the control circuit may include a memory, a processor, and a control circuit board on which the above parts are mounted.

Hereinafter, the light source apparatus 100 will be described.

Figure 4:
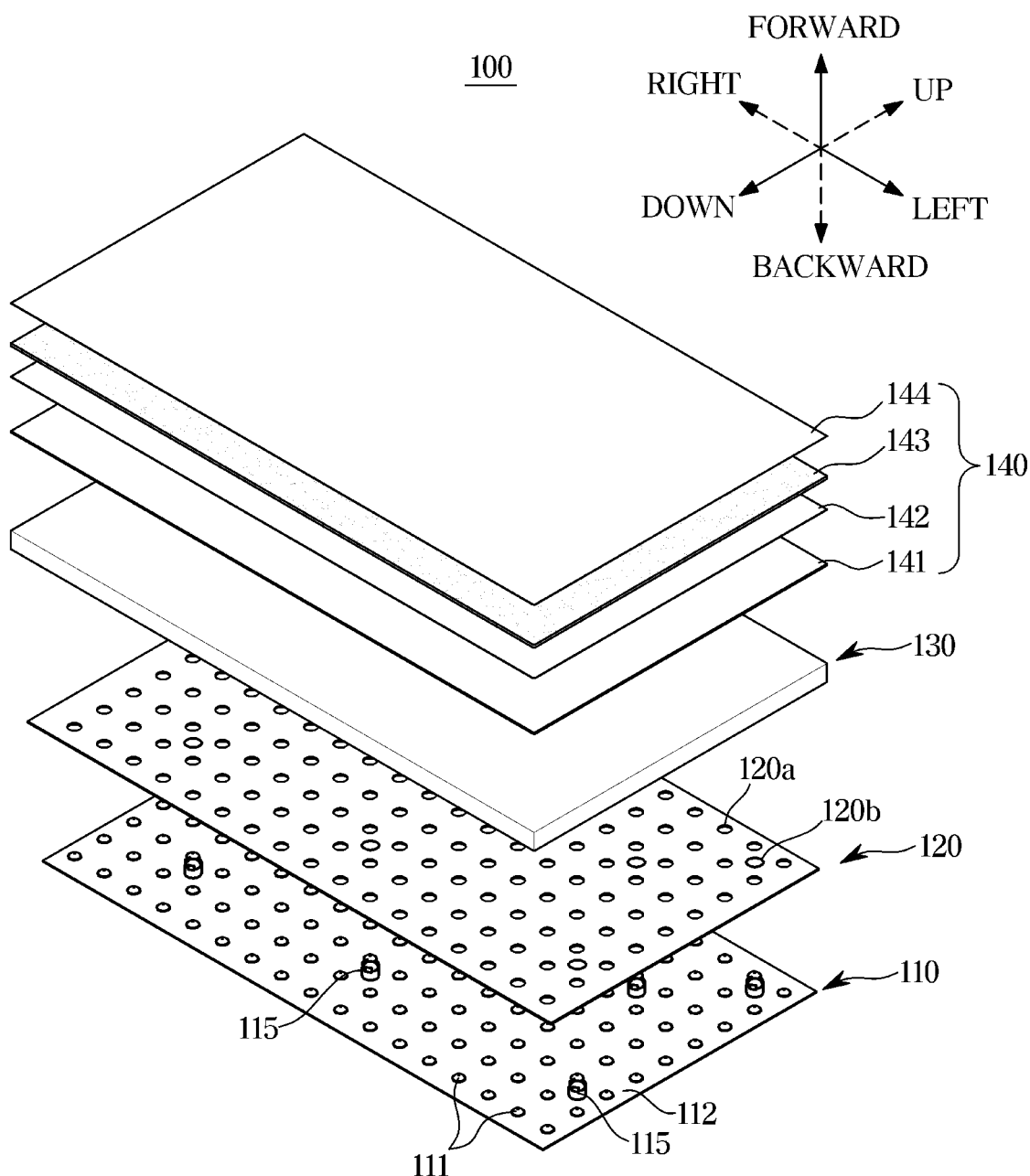
FIG. 4 is an exploded view of a light source apparatus shown in FIG. 2, according to an embodiment.
Figure 5:
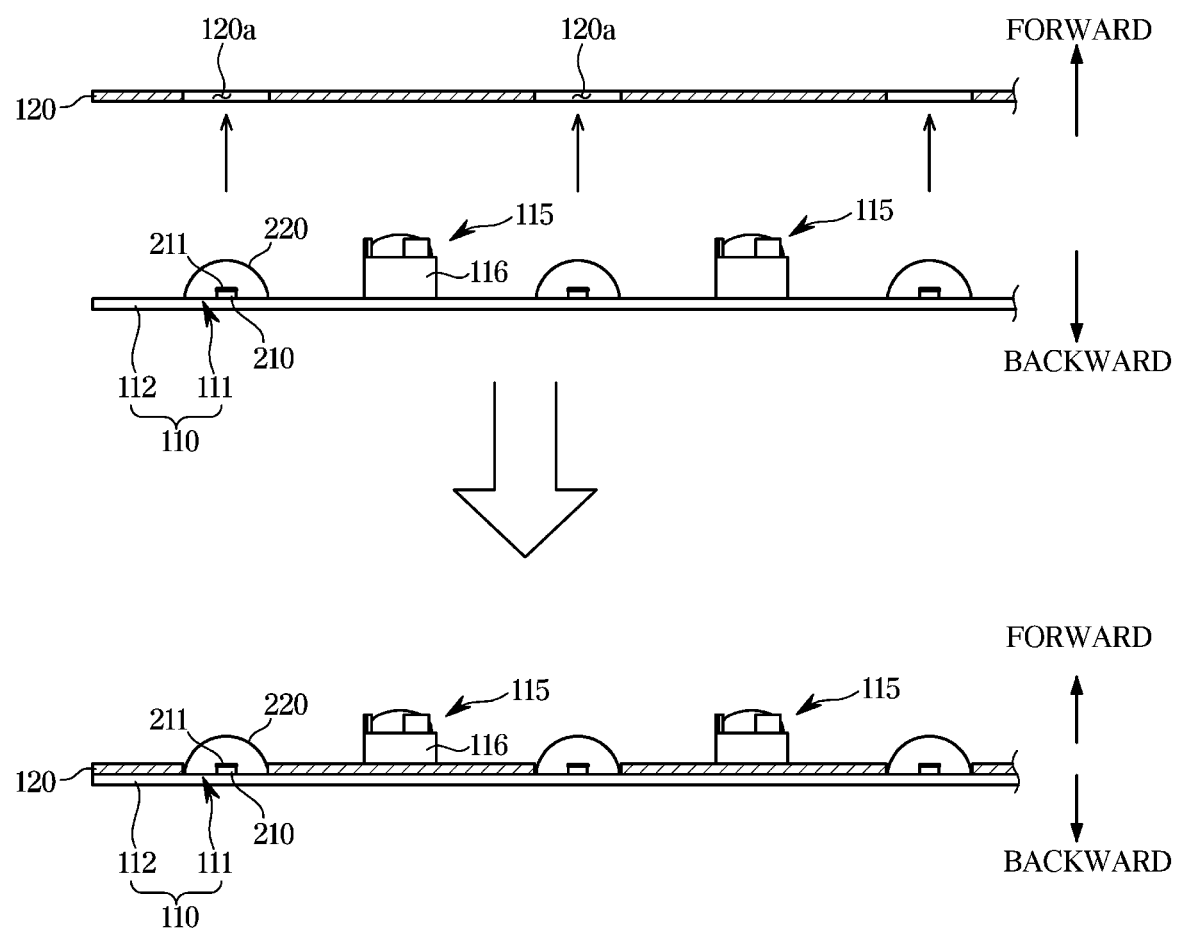
FIG. 5 is a view illustrating the coupling of a light source module and a reflective sheet included in a light source apparatus shown in FIG. 4, according to an embodiment.

FIG. 4 is an exploded view of the light source apparatus shown in FIG. 2, according to an embodiment. FIG. 5 is a view illustrating the coupling of a light source module and s reflective sheet included in the light source apparatus shown in FIG. 4, according to an embodiment.

The light source apparatus 100 includes a light source module 110 configured to generate light, the reflective sheet 120 configured to reflect the light, the diffuser plate 130 configured to uniformly diffuse the light, and the optical sheet 140 configured to improve the luminance of the emitted light. The diffuser plate 130 and the optical sheet 140 may be referred to as optical members 130 and 140.

The light source module 110 may include the plurality of light sources 111 configured to emit light and a substrate 112 configured to support/fix the plurality of light sources 111.

The plurality of light sources 111 may be disposed in a predetermined pattern so that light may be emitted with uniform luminance. The plurality of light sources 111 may be disposed so that distances between one light source and light sources adjacent thereto may become the same.

For example, as shown in FIG. 4, the plurality of light sources 111 may be disposed in rows and columns. Accordingly, a plurality of light sources may be disposed so that that a substantially square may be formed by four adjacent light sources. Further, any one light source may be disposed adjacent to the four light sources, and distances between the one light source and the four light sources adjacent thereto may be approximately the same.

As another example, the plurality of light sources may be disposed in a plurality of rows, and a light source belonging to each row may be disposed at a center between two light sources belonging to adjacent rows. Accordingly, the plurality of light sources may be disposed so that an approximately equilateral triangle may be formed by three adjacent light sources. In this case, one light source may be disposed adjacent to six light sources, and distances between the one light source and the six light sources adjacent thereto may be approximately the same.

However, the pattern in which the plurality of light sources 111 are disposed is not limited to the above-described pattern, and the plurality of light sources 111 may be disposed in various patterns so that light may be emitted with uniform luminance.

The light source 111 may employ an element capable of emitting monochromatic light (light of a specific wavelength, for example, blue light) or white light (for example, a mixture of red light, green light, and blue light) in various directions when power is supplied. For example, the light source 111 may include a light-emitting diode (LED).

The substrate 112 may fix the plurality of light sources 111 so that positions of the light sources 111 are not changed. Further, the substrate 112 may supply power for emitting light by the light sources 111 to each light source 111. The substrate 112 may be disposed behind the optical members 130 and 140.

The substrate 112 may be composed of a synthetic resin or tempered glass or a printed circuit board (PCB) formed with a conductive power supply line configured to fix the plurality of light sources 111 and supply the power to the light sources 111.

Supporters 115 may be installed on the substrate 112. The supporters 115 may be mounted on the substrate 112. The supporters 115 may be disposed between the optical members 130 and 140 and the substrate 112. The supporters 115 may support the components disposed in front of the reflective sheet 120. The supporters 115 may support the diffuser plate 130 and/or the optical sheet 140. The supporters 115 may extend from the substrate 112. The supporters 115 may extend between the substrate 112 and the diffuser plate 130.

The supporters 115 may be provided to maintain the optical characteristics of the light source apparatus 100 by maintaining an optical distance (OD) between the light sources 111 and the diffuser plate 130 and/or the optical sheet 140. The supporter 115 may be provided with a length capable of maintaining the optical characteristics of the light source apparatus 100.

Detailed configurations of the supporters 115 will be described below.

The reflective sheet 120 may reflect the light emitted from the plurality of light sources 111 in a frontward direction or in a direction close to the frontward direction.

A plurality of through holes 120a may be formed in the reflective sheet 120 at positions respectively corresponding to the plurality of light sources 111 of the light source module 110. Further, the light sources 111 of the light source module 110 may pass through the through holes 120a and protrude in front of the reflective sheet 120. The light sources 111 may be located in the through holes 120a.

For example, as shown in an upper side in FIG. 5, in a process of assembling the reflective sheet 120 and the light source module 110, the plurality of light sources 111 of the light source module 110 are inserted into the plurality of through holes 120a formed in the reflective sheet 120, according to an embodiment. As shown in a lower side in FIG. 5, the substrate 112 of the light source module 110 is located behind the reflective sheet 120, but at least a portion of the plurality of light sources 111 of the light source module 110 may be located in front of the reflective sheet 120.

The plurality of light sources 111 may emit light from the front of the reflective sheet 120.

A plurality of supporter holes 120b may be formed in the reflective sheet 120 at positions corresponding to the supporters 115. The supporters 115 may protrude through the supporter holes 120b to support the diffuser plate 130 and/or the optical sheet 140. The supporters 115 may be located in the supporter holes 120b.

The plurality of light sources 111 may emit light in various directions in front of the reflective sheet 120. The light may be emitted toward the diffuser plate 130 from the light sources 111 as well as toward the reflective sheet 120 from the light sources 111, and the reflective sheet 120 may reflect the light emitted toward the reflective sheet 120 toward the diffuser plate 130.

The light emitted from the light sources 111 passes through various objects such as the diffuser plate 130, the optical sheet 140, and the like. When the light passes through the diffuser plate 130 and the optical sheet 140, some of the incident light is reflected from the surfaces of the diffuser plate 130 and the optical sheet 140. The reflective sheet 120 may reflect the light reflected by the diffuser plate 130 and the optical sheet 140.

The diffuser plate 130 may be provided in front of the light source module 110 and the reflective sheet 120, and may uniformly distribute the light emitted from the light sources 111 of the light source module 110.

As described above, the plurality of light sources 111 are located in places on a back surface of the light source apparatus 100. Although the plurality of light sources 111 are disposed at equal intervals on the back surface of the light source apparatus 100, luminance non-uniformity may occur according to the positions of the plurality of light sources 111.

The diffuser plate 130 may diffuse the light emitted from the plurality of light sources 111 in the diffuser plate 130 to remove the luminance non-uniformity due to the plurality of light sources 111. In other words, the diffuser plate 130 may uniformly emit the non-uniform light from the plurality of light sources 111 to the front.

The optical sheet 140 may include various sheets for improving luminance and luminance uniformity. For example, the optical sheet 140 may include a diffuser sheet 141, a first prism sheet 142, a second prism sheet 143, and a reflective polarization sheet 144.

The diffuser sheet 141 diffuses light for luminance uniformity. The light emitted from the light source 111 may be diffused by the diffuser plate 130 and may be diffused again by the diffuser sheet 141 included in the optical sheet 140.

The first and second prism sheets 142 and 143 may increase luminance by focusing the light diffused by the diffuser sheet 141. The first and second prism sheets 142 and 143 include a prism pattern having a triangular prism shape, and a plurality of the prism patterns are arranged to be adjacent to each other to form a plurality of bands.

The reflective polarization sheet 144 is a type of polarization film, and may transmit some of the incident light to improve luminance and reflect the remaining light. For example, polarized light in the same direction as a predetermined polarization direction of the reflective polarization sheet 144 may be transmitted, and polarized light in a direction different from the polarization direction of the reflective polarization sheet 144 may be reflected. Further, the light reflected by the reflective polarization sheet 144 may be recycled in the light source apparatus 100, and the luminance of the display apparatus 10 may be improved by such light recycling.

The optical sheet 140 is not limited to the sheet or film shown in FIG. 4, and may include more various sheets or films, such as a protection sheet and the like.

The light source apparatus 100 may include at least one among the diffuser plate 130, the diffuser sheet 141, the first prism sheet 142, the second prism sheet 143, and the reflective polarization sheet 144.

Figure 6:
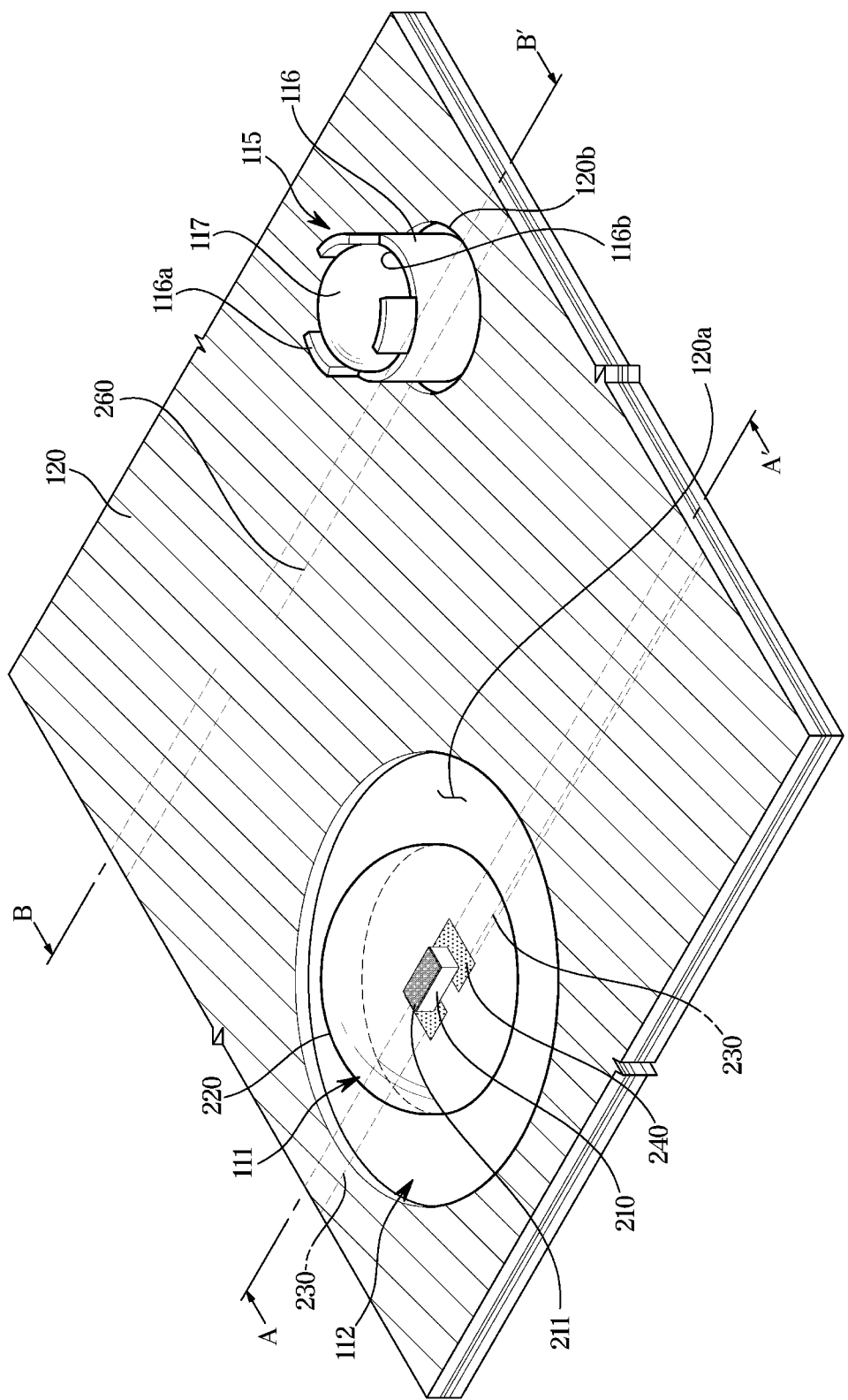
FIG. 6 is an enlarged view of a light source and a supporter included in the light source apparatus shown in FIG. 4, according to an embodiment.
Figure 7:
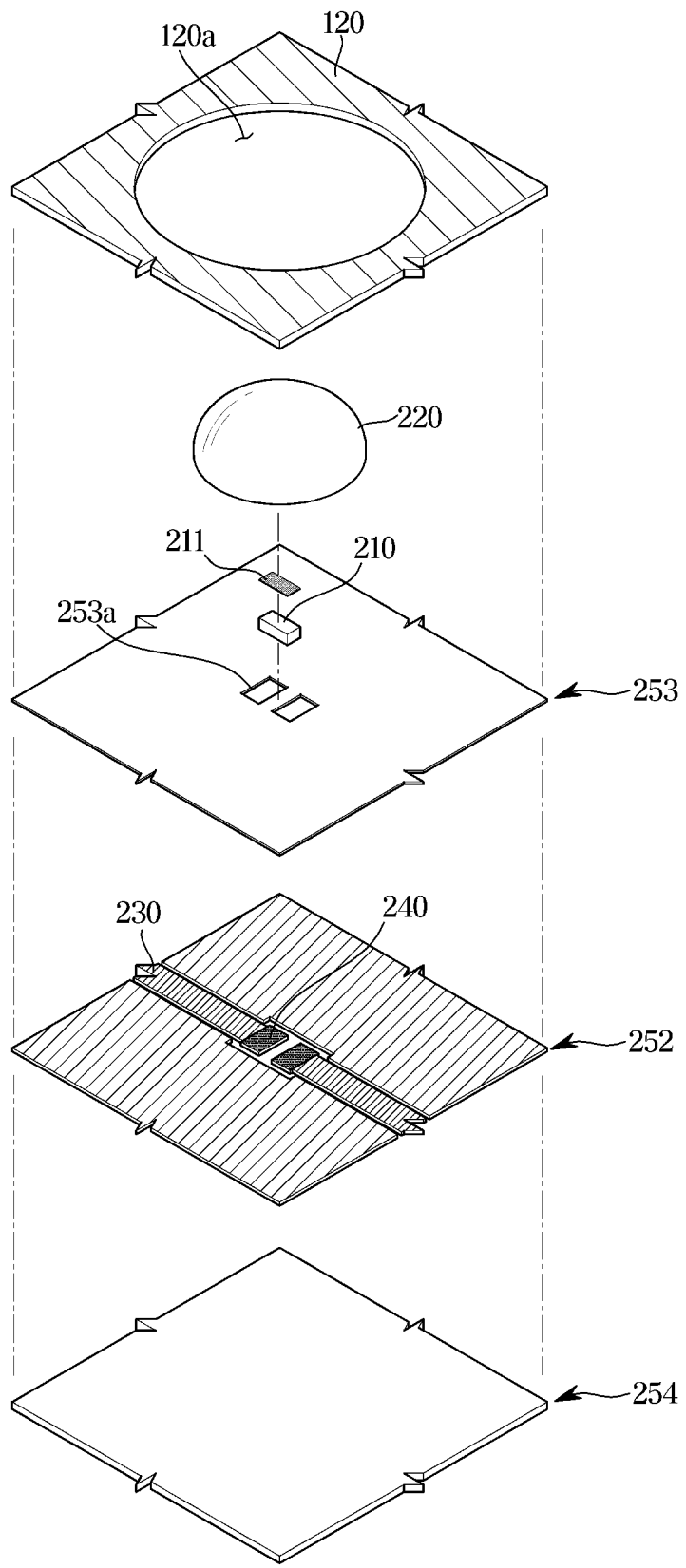
FIG. 7 is an exploded view of the light source shown in FIG. 6, according to an embodiment.
Figure 8:
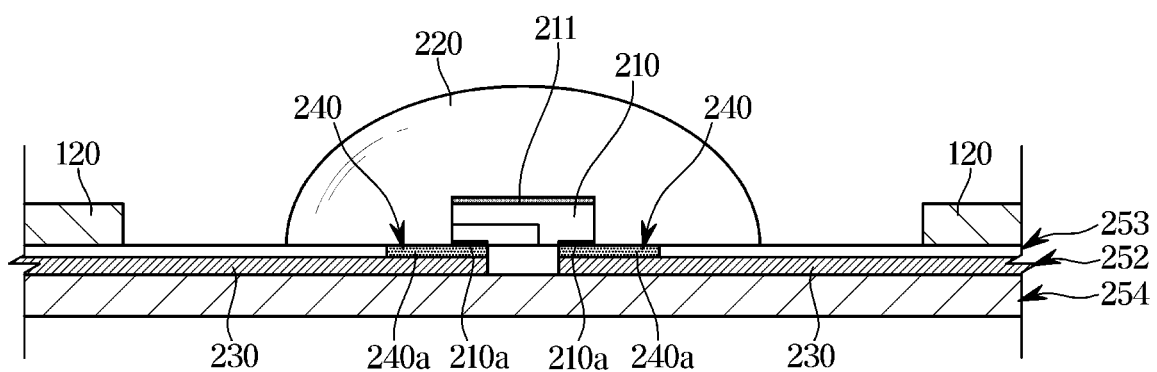
FIG. 8 is a view illustrating a cross-section taken along line A-A' shown in FIG. 6, according to an embodiment.
Figure 9:
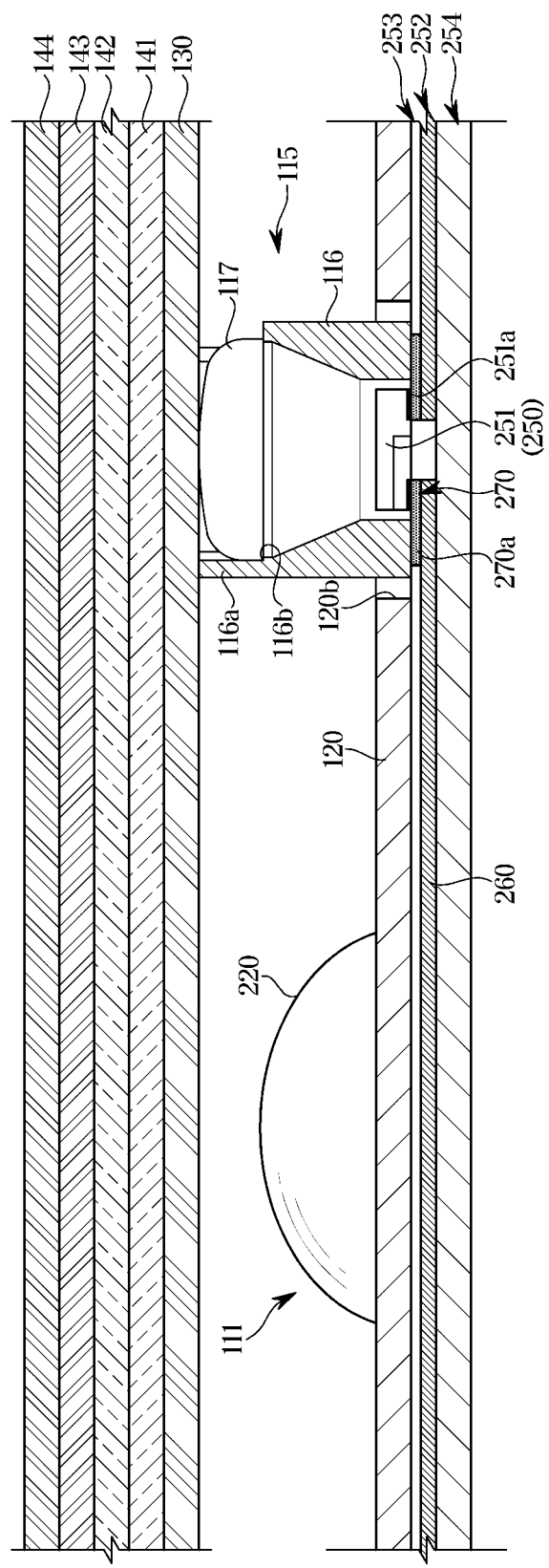
FIG. 9 is a view illustrating a cross-section taken along line B-B' shown in FIG. 6, according to an embodiment.

FIG. 6 is an enlarged view of the light source and the supporter included in the light source apparatus shown in FIG. 4. FIG. 7 is an exploded view of the light source shown in FIG. 6. FIG. 8 is a view illustrating a cross-section taken along line A-A' shown in FIG. 6. FIG. 9 is a view illustrating a cross-section taken along line B-B' shown in FIG. 6.

The light sources 111 and the supporters 115 of the light source apparatus 100 will be described with reference to FIGS. 6 to 9.

As described above, the light source module 110 includes the plurality of light sources 111. The plurality of light sources 111 may pass through the through holes 120a from behind the reflective sheet 120 to protrude to the front of the reflective sheet 120. Accordingly, as shown in FIGS. 6 and 7, the light source 111 and a portion of the substrate 112 may be exposed toward the front of the reflective sheet 120 through the through hole 120a.

The light source 111 may include an electrical/mechanical structure located in a region defined by the through hole 120a of the reflective sheet 120.

Each of the plurality of light sources 111 may include a first light-emitting diode 210, an optical dome 220, and a reflective layer 211.

The first light-emitting diode 210 may include a P-type semiconductor and an N-type semiconductor for emitting light by recombination of holes and electrons. Further, the first light-emitting diode 210 is provided with a pair of first electrodes 210a configured to supply holes and electrons to the P-type semiconductor and the N-type semiconductor, respectively.

The first light-emitting diode 210 may convert electrical energy to optical energy. In other words, the first light-emitting diode 210 may emit light having the maximum intensity at a predetermined wavelength at which power is supplied. For example, the first light-emitting diode 210 may emit blue light having a peak value at a wavelength which represents a blue color (for example, a wavelength between 430 nm to 495 nm).

The first light-emitting diode 210 may be directly attached to the substrate 112 in a chip on board (COB) manner. In other words, the light source 111 may include the first light-emitting diode 210 of which a light-emitting diode chip or a light-emitting diode die is directly attached to the substrate 112 without separate packaging.

In order to miniaturize the light source 111, the light source module 110 in which a flip-chip type first light-emitting diode 210 is attached to the substrate 112 in the chip on board manner may be manufactured.

A first feed line 230 and a first feed pad 240 configured to supply power to the flip-chip type first light-emitting diode 210 are provided on the substrate 112. A second feed line 260 and a second feed pad 270 configured to supply power to a second light-emitting diode 251 are provided on the substrate 112.

The first feed line 230 and the second feed line 260 configured to supply an electrical signal and/or power from the control assembly 50 and/or the power assembly 60 to the first light-emitting diode 210 and the second light-emitting diode 251, respectively are provided on the substrate 112. The second feed line 260 may be provided separately from the first feed line 230.

As shown in FIGS. 8 and 9, the substrate 112 may be formed by alternately stacking a non-conductive insulation layer 254 and a conductive conduction layer 252. The conduction layer 252 may be disposed between the insulation layer 254 and a protection layer 253.

A line or pattern through which power and/or an electrical signal pass/passes is formed in the conduction layer 252. The conduction layer 252 may be composed of various materials having electrical conductivity. For example, the conduction layer 252 may be formed of various metal materials such as copper (Cu), tin (Sn), aluminum (Al), an alloy thereof, and the like.

A dielectric of the insulation layer 254 may insulate between the lines or patterns of the conduction layer 252. The insulation layer 254 may be composed of a dielectric for electrical insulation, for example, FR-4.

The first feed line 230 and the second feed line 260 may be implemented by the line or pattern formed in the conduction layer 252.

The first feed line 230 may be electrically connected to the first light-emitting diode 210 through the first feed pad 240. The second feed line 260 may be electrically connected to the second light-emitting diode 251 through the second feed pad 270.

The first feed pad 240 may be formed by exposing the first feed line 230 to the outside. The second feed pad 270 may be formed by exposing the second feed line 260 to the outside.

The protection layer 253 configured to prevent or suppress damage due to an external impact, damage due to a chemical action (for example, corrosion or the like, and/or damage due to an optical action may be formed on the substrate 112. The protection layer 253 may be provided at one side of the substrate 112 facing the light sources 111. The protection layer 253 may include a photo solder resist (PSR).

As shown in FIG. 8, the protection layer 253 may cover the first feed line 230 to block the first feed line 230 from being exposed to the outside. The protection layer 253 may cover the second feed line 260 to block the second feed line 260 from being exposed to the outside.

A window 253a configured to expose a portion of the first feed line 230 to the outside may be formed in the protection layer 253 for electrical contact between the first feed line 230 and the first light-emitting diode 210. The portion of the first feed line 230 exposed to the outside by the window 253a of the protection layer 253 may form the first feed pad 240.

A first conductive adhesive material 240a for electrical contact between the first feed line 230 exposed to the outside and the first electrode 210a of the first-light-emitting diode 210 is applied to the first feed pad 240. The first conductive adhesive material 240a may be applied in the window 253a of the protection layer 253. The window 253a may be formed so that the first feed pad 240 and the first light-emitting diode 210 electrically come into contact with each other.

The first electrode 210a of the first light-emitting diode 210 may come into contact with the first conductive adhesive material 240a, and the first light-emitting diode 210 may be electrically connected to the first feed line 230 through the first conductive adhesive material 240a.

The first conductive adhesive material 240a may include, for example, solder having electrical conductivity. However, the present disclosure is not limited thereto, and the first conductive adhesive material 240a may include electrically conductive epoxy adhesives.

Power may be supplied to the first light-emitting diode 210 through the first feed line 230 and the first feed pad 240, and when the power is supplied, the first light-emitting diode 210 may emit light. A pair of first feed pads 240 respectively corresponding to a pair of first electrodes 210a provided in the flip-chip type first light-emitting diode 210 may be provided.

The optical dome 220 may cover the first light-emitting diode 210. The optical dome 220 may prevent or suppress damage to the first light-emitting diode 210 due to an external mechanical action and/or damage to the first light-emitting diode 210 due to a chemical action. The optical dome 220 may be provided to be spaced apart from the reflective sheet 120.

The optical dome 220 may have, for example, a dome shape in which a sphere is cut through a surface not including a center, or a hemispherical shape in which a sphere is cut through a surface including the center. A vertical cross-section of the optical dome 220 may be, for example, an arcuate shape or a semicircular shape.

The optical dome 220 may be composed of silicone or epoxy resin. For example, molten silicone or epoxy resin is discharged onto the first light-emitting diode 210 through a nozzle or the like, and thereafter, the optical dome 220 may be formed as the discharged silicone or epoxy resin is cured.

Accordingly, the shape of the optical dome 220 may be variously changed according to the viscosity of liquid silicone or epoxy resin. For example, when the optical dome 220 is manufactured using silicon having a thixotropic index of approximately 2.7 to 3.3 (for example, 3.0), an optical dome 220 of which a dome ratio, which represents a ratio of a height of the dome to a diameter of a lower surface of the dome (the height of the dome/the diameter of the lower surface of the dome), is approximately 0.25 to 0.31 (for example, 0.28) may be formed. For example, in the optical dome 220 manufactured from the silicon having a thixotropic index of approximately 2.7 to 3.3 (for example, 3.0), the diameter of the lower surface may be approximately 2.5 mm, and the height may be approximately 0.7 mm.

The optical dome 220 may be optically transparent or translucent. The light emitted from the first light-emitting diode 210 may pass through the optical dome 220 to be emitted to the outside.

In this case, the dome-shaped optical dome 220 may refract light like a lens. For example, the light emitted from the first light-emitting diode 210 may be refracted by the optical dome 220 to be distributed.

Like the above, the optical dome 220 may protect the first light-emitting diode 210 from an external mechanical action and/or chemical action or an electrical action, and may also distribute the light emitted from the first light-emitting diode 210.

The reflective layer 211 may be located in front of the first light-emitting diode 210. The reflective layer 211 may be disposed on a front surface of the first light-emitting diode 210. The reflective layer 211 may have a multilayer reflective structure in which a plurality of insulating films having different refractive indices are alternately stacked. For example, this multilayer reflective structure may be a distributed Bragg reflector (DBR) in which first insulating films having a first refractive index and second insulating films having a second refractive index are alternately stacked.

The supporter 115 may include a supporter body 116 and an adhesive member 117.

The supporter body 116 may be installed on the substrate 112. The supporter body 116 may be mounted on the substrate 112.

The supporter body 116 may include a material having rigidity for supporting the diffuser plate 130 and/or the optical sheet 140 disposed in front of the reflective sheet 120. The supporter body 116 may be made of an epoxy material having hardness. The supporter body 116 may include a material having higher strength than the adhesive member 117. The supporter body 116 may be made in a white color having relatively high reflectivity to prevent the occurrence of a moire effect in the display apparatus 10. The supporter body 116 may have a substantially cylindrical shape.

A body support 116a is formed at a front end portion of the supporter body 116. The body support 116a may support the optical members 130 and 140. The body support 116a may extend toward the optical members 130 and 140. The body support 116a may come into contact with the diffuser plate 130. FIG. 6 illustrates that three body supports 116a are provided along a circumferential direction of the supporter body 116, but the number of body supports 116a is not limited thereto.

A seater 116b may be formed at the front end portion of the supporter body 116. The seater 116b may be provided at an inner side of the body support 116a. The seater 116b may accommodate the adhesive member 117 therein. The seater 116b may be provided to correspond to the adhesive member 117.

A curing device 250 may be disposed in the supporter body 116. The curing device 250 may include the second light-emitting diode 251 configured to emit light having a wavelength for curing the adhesive member 117.

The second light-emitting diode 251 may be mounted on the substrate 112. The second light-emitting diode 251 may be provided to be driven independently of the first light-emitting diode 210. The second light-emitting diode 251 may be driven while the adhesive member 117 is cured, and in this case, the first light-emitting diode 210 may not be driven.

The second light-emitting diode 251 may receive power through the second feed line 260. A window configured to expose a portion of the second feed line 260 to the outside may be formed in the protection layer 253 for electrical contact between the second feed line 260 and the second light-emitting diode 251. The portion of the second feed line 260 exposed to the outside by the window of the protection layer 253 may form the second feed pad 270.

A second conductive adhesive material 270a for electrical contact between the second feed line 260 exposed to the outside and a second electrode 251a of the second light-emitting diode 251 is applied to the second feed pad 270. The second conductive adhesive material 270a may be applied in the window of the protection layer 253. The window may be formed so that the second feed pad 270 and the second light-emitting diode 251 electrically come into contact with each other.

The second electrode 251a of the second light-emitting diode 251 may come into contact with the second conductive adhesive material 270a, and the second light-emitting diode 251 may be electrically connected to the second feed line 260 through the second conductive adhesive material 270a.

The second conductive adhesive material 270a may include, for example, solder having electrical conductivity. However, the present disclosure is not limited thereto, and the second conductive adhesive material 270a may include electrically conductive epoxy adhesives.

Power may be supplied to the second light-emitting diode 251 through the second feed line 260 and the second feed pad 270, and when the power is supplied, the second light-emitting diode 251 may emit light. A pair of second feed pads 270 respectively corresponding to a pair of second electrodes 251a provided in the flip-chip type second light-emitting diode 251 may be provided.

The second light-emitting diode 251 may be provided to emit light having a wavelength different from that of the first light-emitting diode 210. For example, the second light-emitting diode 251 may be configured to emit ultraviolet light, and the adhesive member 117 may include a material curable by the ultraviolet light emitted from the second light-emitting diode 251.

The adhesive member 117 may be located on the front end portion of the supporter body 116. The adhesive member 117 may be disposed on one end portion of the supporter body 116 facing the optical members 130 and 140. The adhesive member 117 may be located on one end portion of the supporter body 116 facing the diffuser plate 130. The adhesive member 117 may be seated on the seater 116b of the supporter body 116.

The adhesive member 117 may be provided to be curable by the curing device 250. The adhesive member 117 may be provided to be curable by the light emitted from the second light-emitting diode 251. The adhesive member 117 may be provided to be adhered to the diffuser plate 130 and/or the optical sheet 140 disposed in front of the reflective sheet 120 when cured by the curing device 250. The adhesive member 117 may be composed of silicone or epoxy resin.

The adhesive member 117 may include a transparent material or a translucent material. The adhesive member 117 may be optically transparent or translucent. The light emitted from the first light-emitting diode 210 may pass through the adhesive member 117. The adhesive member 117 may have a substantially hemispherical shape protruding toward the optical members 130 and 140 from the supporter body 116.

The second light-emitting diode 251 may be provided to correspond to the adhesive member 117. The second light-emitting diode 251 is provided to emit light having a wavelength capable of curing the adhesive member 117. The adhesive member 117 may include a material cured by light in a short wavelength region, and the second light-emitting diode 251 may be provided to emit light of a short wavelength region. The second light-emitting diode 251 may be provided to emit light having a shorter wavelength than that of the first light-emitting diode 210.

A curing time of the adhesive member 117 may be adjusted according to a size of the second light-emitting diode 251. When the size of the second light-emitting diode 251 is relatively large, the adhesive member 117 may be relatively quickly cured. When the size of the second light-emitting diode 251 is relatively small, the adhesive member 117 may be relatively slowly cured.

According to this configuration, since the display apparatus 10 according to one embodiment of the present disclosure may fix the optical members 130 and 140 to the supporter 115, a change in the optical distance may be minimized, and as the change in the optical distance is minimized, image quality uniformity may be secured, and the moire effect may be improved. Further, since the display apparatus 10 according to one embodiment of the present disclosure fixes the optical members 130 and 140 to the supporter 115, strength may be reinforced, and damage to the optical members 130 and 140 may be prevented.

Figure 10:
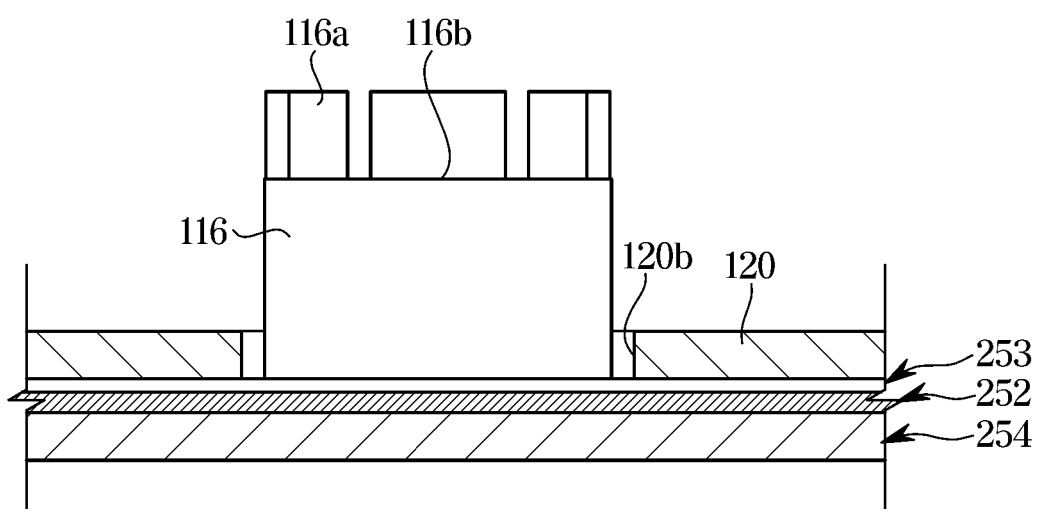
FIG. 10 is a view illustrating a case of providing a supporter body of the supporter shown in FIG. 9, according to an embodiment.
Figure 11:
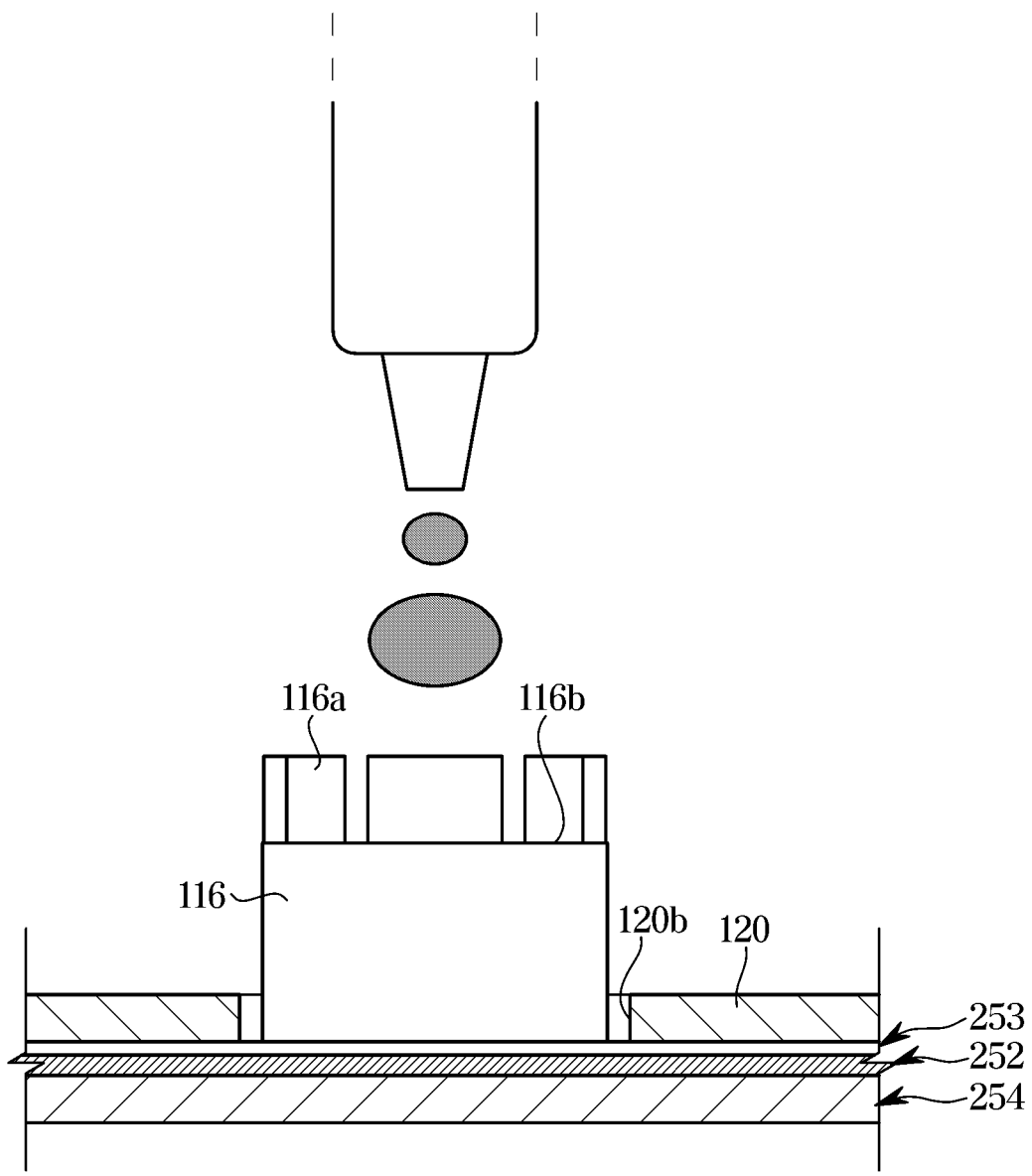
FIG. 11 is a view illustrating a case of dispensing an adhesive member on the supporter body shown in FIG. 10, according to an embodiment.
Figure 12:
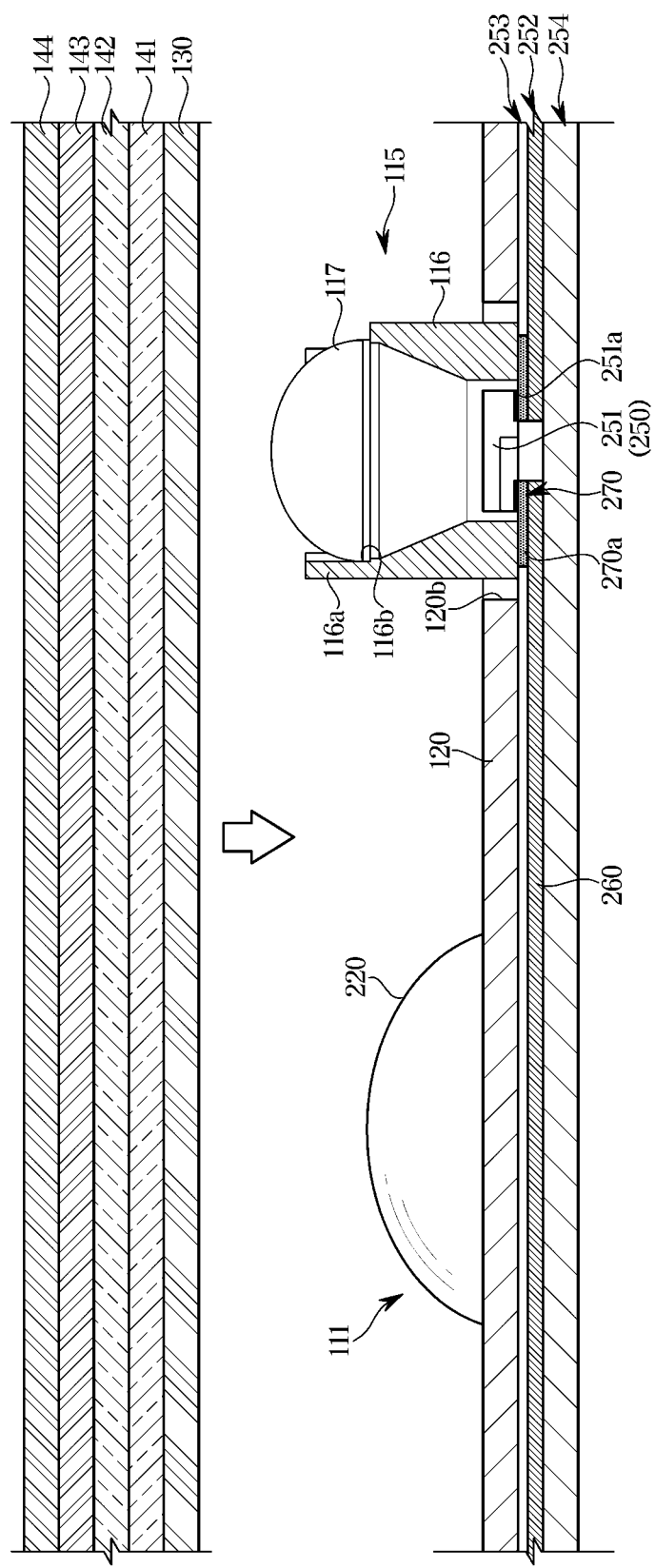
FIG. 12 is a view illustrating a case of attaching the optical member to the supporter shown in FIG. 10, according to an embodiment.
Figure 13:
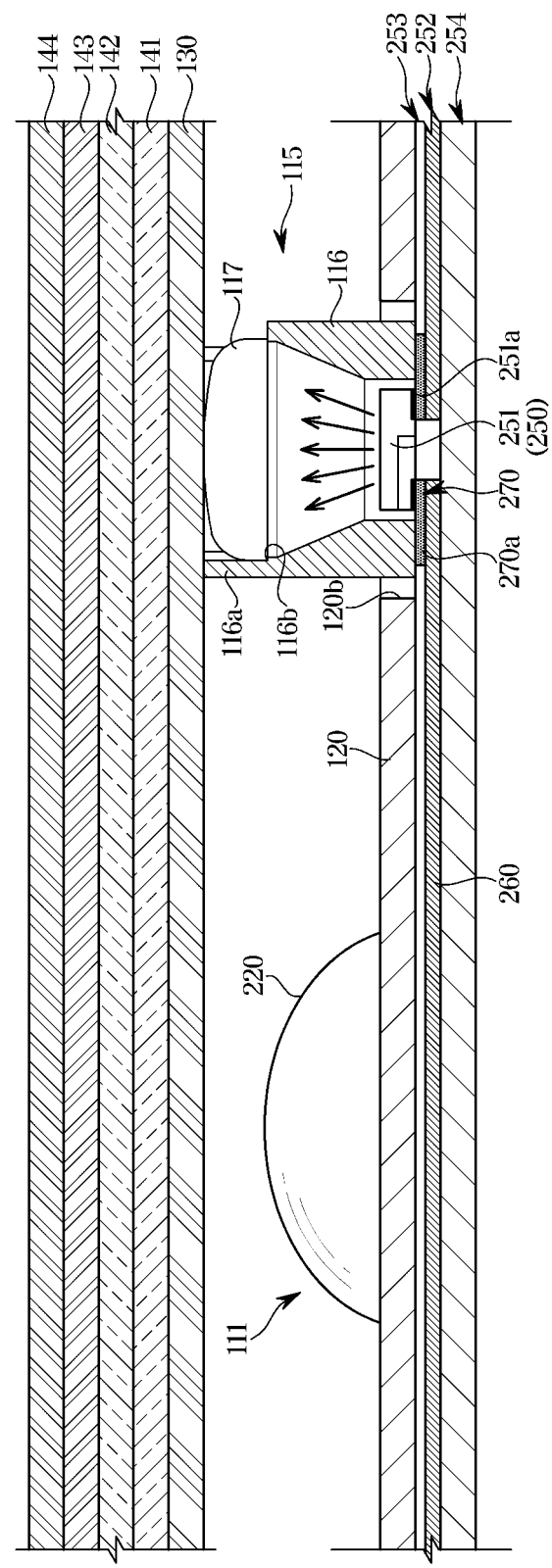
FIG. 13 is a view illustrating a case of curing the adhesive member by operating a second light-emitting diode shown in FIG. 9, according to an embodiment.

FIG. 10 is a view illustrating a case of providing the supporter body of the supporter shown in FIG. 9. FIG. 11 is a view illustrating a case of dispensing the adhesive member on the supporter body shown in FIG. 10. FIG. 12 is a view illustrating a case of attaching the optical member to the supporter shown in FIG. 10. FIG. 13 is a view illustrating a case of curing the adhesive member by operating the second light-emitting diode shown in FIG. 9.

A method of manufacturing the supporter 115 will be described with reference to FIGS. 10 to 13.

First, referring to FIG. 10, the supporter body 116 may be mounted on the substrate 112. The body support 116a and the seater 116b may be formed at the front end portion of the supporter body 116. The second light-emitting diode 251 is provided in the supporter body 116.

Referring to FIG. 11, a molten adhesive member 117 may be discharged to the seater 116b of the supporter body 116 through a nozzle or the like.

Referring to FIG. 12, the optical members 130 and 140 may be provided in front of the supporter body 116 to which the molten adhesive member 117 is discharged.

Referring to FIG. 13, the optical members 130 and 140 may come into contact with the body support 116a of the supporter body 116 to be supported by the body support 116a of the supporter body 116. The second light-emitting diode 251 may be driven to cure the molten adhesive member 117. The adhesive member 117 may be cured by the light emitted from the second light-emitting diode 251. When the second light-emitting diode 251 is driven to cure the adhesive member 117, the first light-emitting diode 210 may not be driven.

Accordingly, as shown in FIG. 9, the adhesive member 117 may be formed.

A process of mounting the second light-emitting diode 251 of the supporter body 116 on the substrate 112 may proceed together with a process of mounting the first light-emitting diode 210 on the substrate 112 or before or after the process of mounting the first light-emitting diode 210 on the substrate 112. Since the process of mounting the second light-emitting diode 251 on the substrate 112 is performed together with the process of mounting the first light-emitting diode 210 on the substrate 112 or before or after the process of mounting the first light-emitting diode 210 on the substrate 112, the light source apparatus 100 may minimize an increase in a manufacturing process.

According to the idea of the present disclosure, in a display apparatus and a light source apparatus thereof, since a supporter is adhered to an optical member by an adhesive member, a change in optical distance can be reduced.

According to the idea of the present disclosure, in the display apparatus and the light source apparatus thereof, since the change in optical distance can be reduced, image quality uniformity can be improved.

According to the idea of the present disclosure, in the display apparatus and the light source apparatus thereof, since the supporter is adhered to the optical member by the adhesive member, strength can be improved.

According to the idea of the present disclosure, in the display apparatus and the light source apparatus thereof, since the optical member is fixed to the adhesive member, damage to the optical member can be prevented.

As described above, the disclosed embodiments have been described with reference to the accompanying drawings. Those skilled in the art should understand that the present disclosure may be implemented in different forms from the disclosed embodiments without changing the technical spirit or essential features of the present disclosure. The disclosed embodiments are exemplary and should not be limitedly interpreted.

What is claimed is:

1. A light source apparatus comprising:
   an optical member;
   a substrate provided at a first side of the optical member;
   a light source provided on the substrate and configured to emit light; and
   a supporter provided between the optical member and the substrate,
   wherein the supporter comprises:
     a supporter body provided on the substrate;
     a curing device provided in the supporter body; and
     an adhesive member provided at a first end of the supporter body that is nearest to the optical member, and
   wherein the adhesive member is adhered to the optical member based on being cured by the curing device.

2. The light source apparatus of claim 1, wherein the curing device comprises a light-emitting diode configured to emit light of a predetermined wavelength to cure the adhesive member.

3. The light source apparatus of claim 2, further comprising:
   a first feed line provided on the substrate and configured to supply power to the light source; and
   a second feed line provided on the substrate and configured to supply power to the light-emitting diode.

4. The light source apparatus of claim 2, wherein the light-emitting diode is configured to emit ultraviolet light; and
   the adhesive member comprises a material that is curable by the ultraviolet light emitted from the light-emitting diode.

5. The light source apparatus of claim 2, wherein the light-emitting diode is further configured to emit light of a first wavelength that is different from a second wavelength of the light emitted from the light source.

6. The light source apparatus of claim 2, wherein the light-emitting diode is further configured to be driven independently of the light source.

7. The light source apparatus of claim 2, wherein the light-emitting diode is provided on the substrate.

8. The light source apparatus of claim 1, wherein the supporter body comprises a body support extending toward and supporting the optical member.

9. The light source apparatus of claim 8, wherein the supporter body comprises a seater at an inner side of the body support, and
   the adhesive member is provided on the seater.

10. The light source apparatus of claim 1, wherein the supporter body comprises a material having a strength that is higher than a strength the adhesive member.

11. The light source apparatus of claim 1, wherein the adhesive member comprises at least one of a transparent material and a translucent material.

12. The light source apparatus of claim 1, wherein the adhesive member is configured so that the light emitted from the light source passes therethrough.

13. The light source apparatus of claim 1, wherein the optical member comprises at least one of a diffuser plate, a diffuser sheet, a prism sheet, and a reflective polarization sheet.

14. A display apparatus comprising:
    a bottom chassis;
    a substrate provided in the bottom chassis;
    a first light-emitting diode provided on the substrate and configured to emit light;
    an optical member provided at a first side of the substrate; and
    a supporter provided between the optical member and the substrate,
    wherein the supporter comprises:
      a supporter body provided on the substrate;
      an adhesive member provided at a first end of the supporter body that is nearest to the optical member; and
      a second light-emitting diode provided in the supporter body and configured to emit light of a predetermined wavelength for curing the adhesive member, and
    wherein the adhesive member is adhered to the optical member based on being cured by the second light-emitting diode.

15. A light source apparatus comprising:
    an optical member;
    a light source configured to emit light; and
    a supporter provided between the optical member and a substrate,
    wherein the supporter comprises:
      an adhesive member provided at a first end of a supporter body, the first end being nearest to the optical member; and
      a light-emitting diode provided in the supporter body and configured to emit light of a predetermined wavelength for curing the adhesive member, and
    wherein the adhesive member is adhered to the optical member based on being cured by the light-emitting diode.

16. The light source apparatus of claim 15, wherein the predetermined wavelength corresponds to a first wavelength for curing the adhesive member.

17. The light source apparatus of claim 15, wherein a curing time of the adhesive member corresponds to a size of the light-emitting diode.

18. The light source apparatus of claim 17, wherein the curing time of the adhesive member is inversely proportional to the size of the light-emitting diode.

* * * * *